(12) United States Patent
Patel

(10) Patent No.: US 8,882,967 B1
(45) Date of Patent: Nov. 11, 2014

(54) SYSTEMS AND METHODS FOR PURIFYING PROCESS WATER

(71) Applicant: Southern Company, Atlanta, GA (US)

(72) Inventor: Dhansukhbhai V. Patel, Atlanta, GA (US)

(73) Assignee: The Southern Company, Atlanta, GA (US)

( * ) Notice: Subject to any disclaimer, the term of this patent is extended or adjusted under 35 U.S.C. 154(b) by 0 days.

(21) Appl. No.: 14/277,181

(22) Filed: May 14, 2014

(51) Int. Cl.
*C02F 1/04* (2006.01)
*B01D 1/06* (2006.01)
*C02F 1/20* (2006.01)
*B01D 63/00* (2006.01)
*B01D 53/22* (2006.01)
*B01D 1/00* (2006.01)

(52) U.S. Cl.
CPC . *C02F 1/048* (2013.01); *C02F 1/20* (2013.01); *B01D 63/00* (2013.01); *B01D 53/22* (2013.01); *C02F 1/04* (2013.01); *B01D 1/0082* (2013.01); *B01D 1/06* (2013.01); *B01D 2311/08* (2013.01); *B01D 2311/2673* (2013.01); *B01D 2311/2669* (2013.01)
USPC ...... 203/2; 203/10; 203/11; 203/91; 210/650; 159/47.1; 159/47.3; 96/6; 96/155

(58) Field of Classification Search
CPC .......... B01D 1/00; B01D 1/0082; B01D 1/06; B01D 19/0031; B01D 53/22; B01D 63/00; B01D 2053/22; B01D 2311/08; B01D 2311/2669; B01D 2311/2673; C02F 1/04
USPC ........... 95/46, 241; 96/6, 155; 159/47.1, 47.3; 203/2, 10, 11, 91; 202/163, 185.1; 210/650
See application file for complete search history.

(56) References Cited

U.S. PATENT DOCUMENTS

| | | | | |
|---|---|---|---|---|
| 3,890,207 | A * | 6/1975 | Chapman et al. | 203/11 |
| 4,344,826 | A * | 8/1982 | Smith | 203/2 |
| 4,434,057 | A * | 2/1984 | Marquardt | 210/638 |
| 5,433,936 | A * | 7/1995 | Ukawa et al. | 423/243.01 |
| 5,705,046 | A * | 1/1998 | Miwata et al. | 204/523 |
| 6,878,358 | B2 * | 4/2005 | Vosteen et al. | 423/210 |
| 7,560,029 | B2 * | 7/2009 | McGinnis | 210/644 |
| 8,388,917 | B2 * | 3/2013 | Ukai et al. | 423/210 |
| 8,414,685 | B2 * | 4/2013 | Konopka | 95/46 |
| 8,771,522 | B2 * | 7/2014 | Tokoshima | 210/762 |
| 2002/0061270 | A1 * | 5/2002 | Osborne | 423/210 |
| 2003/0132095 | A1 * | 7/2003 | Kenet et al. | 202/182 |
| 2005/0139555 | A1 * | 6/2005 | Dancuart Kohler et al. | 210/767 |
| 2008/0118418 | A1 * | 5/2008 | Morita | 422/255 |
| 2010/0047422 | A1 * | 2/2010 | Magalhes Mendes et al. | 426/494 |
| 2010/0230366 | A1 * | 9/2010 | Bigeonneau et al. | 210/750 |
| 2011/0084025 | A1 * | 4/2011 | Tominaga et al. | 210/638 |
| 2011/0209391 | A1 * | 9/2011 | Miglio et al. | 44/451 |

(Continued)

*Primary Examiner* — Nina Bhat
*Assistant Examiner* — Jonathan Miller
(74) *Attorney, Agent, or Firm* — Troutman Sanders LLP; Ryan A. Schneider; Dustin B. Weeks

(57) ABSTRACT

Disclosed are methods for purifying a process water, which can comprise providing a process water comprising a first concentration of a first dissolved gas and a first concentration of a first dissolved ion, filtering the process water to create a filtered process water comprising a second concentration of the first dissolved gas, and evaporating the filtered process water to create a water vapor comprising a second concentration of the first dissolved ion that is less than the first concentration of the first dissolved ion.

20 Claims, 2 Drawing Sheets

(56) References Cited

U.S. PATENT DOCUMENTS

| | | | |
|---|---|---|---|
| 2011/0262331 A1* | 10/2011 | Ukai et al. ................. | 423/235 |
| 2012/0024784 A1* | 2/2012 | Clark et al. ................ | 210/638 |
| 2012/0111051 A1* | 5/2012 | Kulkarni et al. ............ | 62/619 |
| 2012/0152840 A1* | 6/2012 | Fujita et al. ............... | 210/640 |
| 2012/0267307 A1* | 10/2012 | McGinnis ................... | 210/638 |

* cited by examiner

SYSTEMS AND METHODS FOR PURIFYING PROCESS WATER

TECHNICAL FIELD OF THE INVENTION

The various embodiments of the present disclosure relate generally to water purification systems and methods. More particularly, the various embodiments of the present invention are directed to systems and methods for purifying a process water.

BACKGROUND OF THE INVENTION

Power plants, particularly those operating wet scrubbers, producing a process water must comply with strict water treatment requirements that set the treated water levels for a number of constituents, including selenium, arsenic, nitrate, and mercury. The requirements also include prohibition of treated water reuse unless the water meets set concentration limits. The U.S. Environmental Protection Agency (EPA) recently proposed rules that would require all flue gas desulfurization (FGD) process wastewaters to meet best available technology (BAT) limits prior to re-use, mixing with other plant streams, or discharge. The proposed limits are shown in Table 1.

TABLE 1

| Constituent | Maximum for any day | Average of daily values (30 consecutive days) |
| --- | --- | --- |
| Arsenic, total | 8 µg/L | 6 µg/L |
| Mercury, total | 242 ng/L | 119 ng/L |
| Selenium, total | 16 µg/L | 10 µg/L |
| Nitrate plus nitrite, as N | 0.17 mg/L | 0.13 mg/L |

EPA also proposed limits for gasification wastewater, which are shown in Table 2. For gasification wastewater treatment, the proposed limits for mercury and arsenic are much lower than the corresponding limits for FGD process wastewater treatment.

TABLE 2

| Constituent | Maximum for any day | Average of daily values (30 consecutive days) |
| --- | --- | --- |
| Arsenic, total | 4 µg/L | — |
| Mercury, total | 1.76 ng/L | 1.29 ng/L |
| Selenium, total | 453 µg/L | 227 µg/L |
| Total Dissolved Solids | 38 mg/L | 22 mg/L |

Accordingly, for a water treatment process to be commercially viable, it must consistently be able to produce treated water with concentrations that are lower than the "average of daily values" limit. While occasional "upset" conditions are allowed, the "daily maximum" limits must still be met.

Challenges

EPA's proposed effluent limit guidelines set a minimum standard of treatment that will be required to be incorporated into NPDES discharge permit revisions starting in 2017, and completing by 2021. Individual permitting authorities, however, are free to set lower discharge requirements to meet their local water quality and environmental protection requirements. As such, a few power plants may already meet or exceed the discharge requirements outlined in EPA's proposal.

For facilities that do not meet EPA's proposed standards, the challenges for implementing the changes necessary to comply with the proposed standards range from minimal to extensive. For some facilities, it may mean the addition of an extra treatment step to an existing water treatment plant or the addition of a new process with specific treatment chemistry. For other plants, it can mean an entire rethink of the water management scheme and practices.

For an affected plant, the first steps are to identify the magnitude of the challenge. Water and mass balance development will become the basis for all decisions in achieving compliance. It is important to ensure that sampling and generation of the water balance captures the variability and changes that are seen in many streams, particularly FGD blow-down, any landfill leachates, and other water that may have contacted coal combustion byproducts. Changes in fuel, air pollution control reagents, plant operation, and use of other air emissions control technologies can all change speciation of constituents and the composition of the wastewater and subsequently, the approach to treatment. As a result, the need for a robust, flexible wastewater treatment process is paramount.

Existing Treatment Technologies

FGD processes are widely used for controlling air emissions from coal fired power plants. These processes use an alkaline sorbent, usually as limestone, in a slurry form to react with flue gas constituents and produce calcium sulfite ($CaSO_3$). The majority of these processes then use excess oxidation air to convert the $CaSO_3$ to calcium sulfate ($CaSO_4$) or gypsum. The gypsum can be readily separated and disposed of in a landfill, or sold.

EPA has proposed that wastewater after gypsum removal must be treated to remove a number of constituents, i.e., dissolved ions in the wastewater, to very low levels. Such constituents include selenium, mercury, arsenic, and nitrate/nitrite-nitrogen. The EPA further identified BAT for FGD streams as physical/chemical precipitation combined with anoxic/anaerobic biological treatment. GE's ABMet technology is an example of one commercially available anoxic/anaerobic biological system.

Physical/chemical treatment of wastewater is widely used at power plants. The process typically uses an alkali, e.g., hydrated lime, to raise the pH of the water to a point where metals precipitate as metal hydroxides. Additional chemicals, e.g., ferric chloride, are often added to aid in further reductions through iron co-precipitation as well as acting as a coagulant to help in settling. Depending on the loadings and targets of certain constituents, organo-sulfide chemicals can also be added to improve the removal of constituents such as mercury to low, part-per-trillion levels. Precipitated solids are removed using clarification and dewatering and then transferred to landfills. At very low levels, e.g., for mercury, process operators have had difficulty maintaining performance of the process.

Constituents such as selenium and nitrate require further treatment and anoxic/anaerobic biological treatment is usually applied. Occasionally, such processes have produced ammonia in the treated water stream which must also be removed. Systems such as GE's ABMet utilize naturally-occurring, anaerobic bacteria to create a reducing environment. These bacteria are seeded into a plug-flow biofilter that utilizes carbon media to establish a biofilm for the bacteria to attached to and grow. The water is dosed with an engineered nutrient solution, and flows through a plug-flow biofilter where it encounters different reducing conditions in series: denitrification of nitrate and nitrite to nitrogen gas; reduction of dissolved selenium to insoluble elemental particulate; reduction of mercury; and finally, sulfide generation to allow precipitation of insoluble metal-sulfides. The size of the individual reduction steps is sized according to the composition of the water to be treated, potentially reducing the ability of the process to be flexible to influent water changes. The constituents are removed from the biofilter through monthly backwashes and the solids are often sent to the physical/chemical system for co-processing with its solids. Challenges may remain for ensuring that the constituents removed from wastewater in the backwash are properly sequestered in a landfill setting.

While a number of water treatment options are available, including the options discussed above, there are a number of known issues and limitations, some of which are discussed below.

Variability in Process Performance

The concentration, concentration variability, and/or form of various constituents in the water, especially for selenium, are important factors that can affect some water treatment processes. For example, the selenate form of selenium is not well removed by physical/chemical treatment processes.

The combinations of constituents in the water can also be a factor for some processes. For example, some biological processes require the removal of nitrate before selenium can be removed. In such cases, the amount of nitrate present in the water can affect overall process performance. The amount of chloride or swings in the chloride concentration of the influent water can also change the performance of biological processes. Microbe cells are sensitive to both high and low chloride levels, and also relatively fast changes in the chloride level.

Some processes are more sensitive to the temperature of the influent water (the water can be too warm or too cold). In general, biological processes for selenium removal are more sensitive and work better in the optimum temperature range.

Variability of other factors, including oxygen reduction potential (ORP), are: little or no reduction in the concentration of some constituents, including boron, bromide, chloride and sulfate; unknown effects on water treatment process performance of coal fuel changes or coal fuel blending; high reagent usage rates; and durability for extended outage or for periods when there are frequent process starts and stops.

In addition, conventional evaporative processes produce distillate that contains higher than acceptable levels of several constituents, including selenium, mercury and chloride. Some evaporative processes also produce distillate water that has a low pH value.

Therefore, there is a desire for improved systems and methods for purifying process water. Various embodiments of the present invention address these desires.

BRIEF SUMMARY OF THE INVENTION

The present invention relates to systems and methods of purifying a process water. An exemplary embodiment of the present invention provides a method of processing water comprising providing a process water, filtering the process water to create a filtered process water, and evaporating the filtered process water to create a water vapor. The process water can comprise a first concentration of a first dissolved gas and a first concentration of a first dissolved ion. The filtered process water can comprise a second concentration of the first dissolved gas. The second concentration of the first dissolved gas can be less than the first concentration of the first dissolved gas. The water vapor can comprise a second concentration of the first dissolved ion that is less than the first concentration of the first dissolved ion.

In some embodiments of the present invention, filtering the process water comprises passing the process water through a degasifying membrane module. The module can comprise a water chamber comprising an inlet and outlet, a vacuum chamber, and a membrane separating the water chamber from the vacuum chamber. The water chamber can be at a first pressure. The vacuum chamber can be at a second pressure that is less than the first pressure.

In some embodiments of the present invention, the method further comprises injecting the process water into the degasifying membrane module at the inlet of the water chamber, diffusing at least a portion of the dissolved gas in the process water across the membrane and into the vacuum chamber to remove at least a portion of the first dissolved gas from the process water, and ejecting the filtered process water out of the degasifying membrane module at the outlet of the water chamber.

In some embodiments of the present invention, the first pressure minus the second pressure is no greater than 40 PSI.

In some embodiments of the present invention, the process water is evaporated at a pressure of less than 5 PSIA.

In some embodiments of the present invention, the process water is evaporated at a temperature between about 40 degrees Celsius and about 65 degrees Celsius.

In some embodiments of the present invention, the method further comprises condensing the water vapor.

In some embodiments of the present invention, the process water is a flue gas desulfurization process water, the plurality of dissolved ions comprises selenium, and a concentration of selenium in the collected water vapor is less than 10 parts per billion.

In some embodiments of the present invention, the process water further comprises a first concentration of a second dissolved ion and the water vapor further comprises a second concentration of the second dissolved ion that is less than the first concentration of the second dissolved ion.

In some embodiments of the present invention, the process water further comprises a first concentration of a second dissolved gas and the filtered process water comprises a second concentration of the second dissolved gas that is less than the first concentration of the second dissolved gas.

Another exemplary embodiment of the present invention provides a system for purifying a process water comprising a degasifying membrane module and an evaporator. The degasifying membrane module can be configured to receive a process water comprising a first concentration of a first dissolved ion and a first concentration of a first dissolved gas and filter the process water to create a filtered process water comprising a second concentration of the first dissolved gas that is less than the first concentration of the first dissolved gas. The evaporator can be configured to receive the filtered process water and evaporate the filtered process water to produce water vapor comprising a second concentration of the first dissolved ion that is less than the first concentration of the first dissolved ion.

In some embodiments of the present invention, the system further comprises a condenser configured to condense the water vapor to liquid water.

In some embodiments of the present invention, the degasifying membrane module comprises a water chamber, a vacuum chamber, and a membrane separating the water chamber from the vacuum chamber. The water chamber can be at a first pressure. The vacuum chamber can be at a second pressure that is less than the first pressure. The water chamber can comprise an inlet configured to receive the process water and an outlet configured to eject the filtered process water. The degasifying membrane module can be configured to diffuse at least a portion of the dissolved gas in the process water across the membrane and into the vacuum chamber.

In some embodiments of the present invention, the first pressure minus the second pressure is no greater than 40 PSI.

In some embodiments of the present invention, a pressure within the evaporator is less than 5 PSIA.

In some embodiments of the present invention, a temperature within the evaporator is between about 40 degrees Celsius and about 65 degrees Celsius.

In some embodiments of the present invention, the process water is a flue gas desulfurization process water, the first dissolved ion is selenium, and the second concentration of the first dissolved ion is less than 10 parts per billion.

In some embodiments of the present invention, the process water further comprises a first concentration of a second dissolved ion, and the water vapor comprises a second concentration of the second dissolved ion that is less than the first concentration of the second dissolved ion.

In some embodiments of the present invention, the process water further comprises a first concentration of a second dissolved gas, and the filtered process water comprises a second concentration of the second dissolved gas that his less than the first concentration of the second dissolved gas.

Another exemplary embodiment of the present invention provides a method of purifying a process water comprising injecting a process water into a water chamber of a degasifying membrane module. The process water can comprise a first concentration of a first dissolved gas and a first concentration of a first dissolved ion. The degasifying membrane module can comprise the water chamber at a first pressure, a vacuum chamber at a second pressure that is less than the first pressure, and a membrane separating the water chamber from the vacuum chamber. The method further comprises diffusing a portion of the first dissolved gas across the membrane and into the vacuum chamber to create a filtered process water comprising a second concentration of the first dissolved gas that is less than the first concentration of the first dissolved gas. The method further comprises ejecting the filtered process water from the water chamber and receiving the filtered process water at an evaporator. The method further comprises evaporating the filtered process water in the evaporator at a temperature between about 40 degrees Celsius and about 65 degrees Celsius and at a pressure less than about 5 PSIA to create a water vapor comprising a second concentration of the first dissolved ion that is less than the first concentration of the first dissolved ion.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The following Detailed Description of the Invention is better understood when read in conjunction with the appended drawings. For the purposes of illustration, there is shown in the drawings exemplary embodiments, but the subject matter is not limited to the specific elements and instrumentalities disclosed.

DETAILED DESCRIPTION OF THE INVENTION

To facilitate an understanding of the principles and features of the present invention, various illustrative embodiments are explained below. To simplify and clarify explanation, the invention is described below as applied to treatment of a process water from a fossil fuel electric power plant. One skilled in the art will recognize, however, that the invention is not so limited. Instead, as those skilled in the art would understand, the various embodiments of the present invention also find application in other areas, including, but not limited to, areas and industries where it is desirable to purify water.

The components, steps, and materials described hereinafter as making up various elements of the invention are intended to be illustrative and not restrictive. Many suitable components, steps, and materials that would perform the same or similar functions as the components, steps, and materials described herein are intended to be embraced within the scope of the invention. Such other components, steps, and materials not described herein can include, but are not limited to, similar components or steps that are developed after development of the invention.

Conventional process waters, e.g., FGD process water, often comprise one or more dissolved gases, e.g., oxygen, nitrogen, and/or carbon dioxide, and one or more dissolved ions, e.g., selenium, mercury, and/or arsenic. A conventional evaporative purification technique involves evaporating the process water to separate treated water (the vapors) from the dissolved ions in the process water. Unfortunately, even after evaporating the process water in these conventional techniques, the vapor, i.e., treated water, often contains levels of the dissolved ions that are higher than desired. In other words, the treated water contains levels of the dissolved ions at levels higher than desired. Accordingly, these conventional techniques are insufficient to satisfy the increasing demands for water treatment that continue to require reductions in the concentrations of the dissolved ions present in treated water.

The inventor of the present invention, however, determined that the concentration of many dissolved ions in the treated water can be drastically reduced if at least a portion of the dissolved gas in the process water is filtered out prior to the evaporation step. Accordingly, various embodiments of the present invention provide systems and methods for treating/purifying a process water by filtering at least a portion of dissolved gas from the process water prior to an evaporating step.

Figure 1:
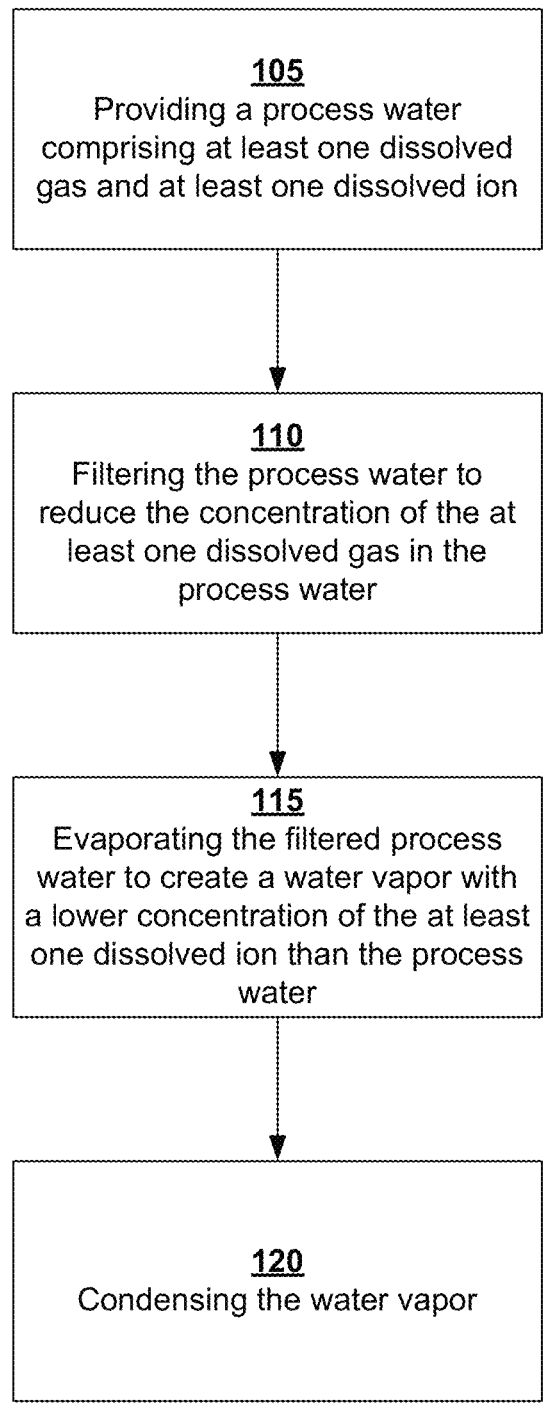
FIG. 1 provides flow diagram illustrating a method of purifying a process water, in accordance with an exemplary embodiment of the present invention.

As shown in FIG. 1, an exemplary embodiment of the present invention provides a method of purifying a process water, comprising providing a process water 105, filtering the process water 110, and evaporating the process water 115. The process water provided can comprise one or more dissolved gases and one or more dissolved ions. In an exemplary embodiment of the present invention, the provided process water comprises a first concentration of a first dissolved gas and a first concentration of a first dissolved ion.

The method also comprises filtering the process water 110. The process water can be filtered to reduce the concentration of one or more of the dissolved gases in the process water. Thus, filtering can result in a process water with a decreased concentration of the one or more dissolved gases. In an exemplary embodiment of the present invention, the filtering the process water creates a filtered process water comprising a second concentration of the first dissolved gas. The second concentration of the first dissolved gas can be less than the first concentration of the first dissolved gas, i.e., filtering can reduce the concentration of the first dissolved gas in the process water.

Filtering the process water to reduce the concentration of the one or more dissolved gases 110 can be accomplished many different ways known in the art. In an exemplary embodiment of the present invention, filtering the process water 110 comprises passing the process water through one or more degasifying membrane modules. Each membrane module can comprise a water chamber with an inlet and an outlet, a vacuum chamber, and a membrane separating the water chamber from the vacuum chamber. The process water can enter the water chamber through the inlet and exit the water chamber through the outlet. The water chamber can be at a first pressure. The vacuum chamber can be at a second pressure that is less than the first pressure in the water chamber. As the process water passes through the water chamber, the pressure differential between the water and vacuum chambers can cause at least a portion of the dissolved gas in the process water to diffuse across the membrane into the vacuum chamber. Thus, the process water exiting the water chamber via the outlet can have a lower concentration of the dissolved gas than when it entered the water chamber.

The pressures in the water and vacuum chambers can vary according to a number of factors and can be controlled, e.g., by valves at the inlet and outlet. For example, the pressure in the water chamber can vary according to the mechanical strength limits of the membrane. The pressure in the vacuum chamber can be many different pressures in accordance with different embodiments of the present invention. In an exemplary embodiment of the present invention, the pressure in the vacuum chamber can be between about 0 PSIA and about 4 PSIA. The pressure differential between the water and vacuum chambers can also be many different values. In an exemplary embodiment of the present invention, the pressure differential between the water and vacuum chambers is no greater than about 40 PSI.

As discussed above, in some embodiments of the present invention, multiple membrane modules can be used to filter the process water. For example, multiple membrane modules can be set in parallel to allow one or more of the membrane modules to be out of service for routine cleaning. In this way, whole process water would continue to flow in the process even when one or more membrane modules are out of service. When taking one or more modules out of service, e.g., for cleaning, the pressure in the water chamber of the other membrane modules can remain substantially constant by adjusting valves at the inlet and outlet to the water chambers of those modules.

After the process water is filtered, the method can further comprise evaporating the filtered process water to create a water vapor 115. The water vapor can comprise a concentration of the one or more dissolved ions less than the concentration of the one or more dissolved ions in the process water. In an exemplary embodiment of the present invention, evaporating the filtered process water 115 creates a water vapor comprising a second concentration of the first dissolved ion that is less than the first concentration of the first dissolved ion in the process water.

The filtered process water can be evaporated many different ways known in the art in accordance with various embodiments of the present invention. In an exemplary embodiment of the present invention, the filtered process water can be evaporated using a falling film evaporator. The invention recognizes the resulting water vapor is more desirable when the evaporation takes place at lower pressures than employed in conventional techniques. Accordingly, in some embodiments of the present invention, the falling film evaporator is operated to allow the water to be evaporated at a reduced pressure of about 2 PSIA and a temperature of about 40-65 degrees Celsius. The heat for evaporating the water can be supplied, e.g., by low pressure steam, with the condensate returned to an external heat source to create new low pressure steam.

After evaporation, the method can further comprise condensing the water vapor 120 where it is turned into liquid water. The condenser can be cooled by, e.g., air, water, or a combination of the two to improve efficiency. Water can be recirculated in the evaporator at a rate that produces a steady stream of condensate water that complies with a predetermined quality, e.g., the EPA's proposed limits for certain dissolved ions, e.g., selenium, arsenic, nitrate, and mercury. Residual water can be drawn from the bottom of the evaporator to maintain a steady water level in the evaporator. The residual water can contain a minimal amount of the suspended solids and can be suitable for deep well injection or for use in creating a solid by mixing it with fly ash, gypsum, lime, and/or other materials.

Figure 2:
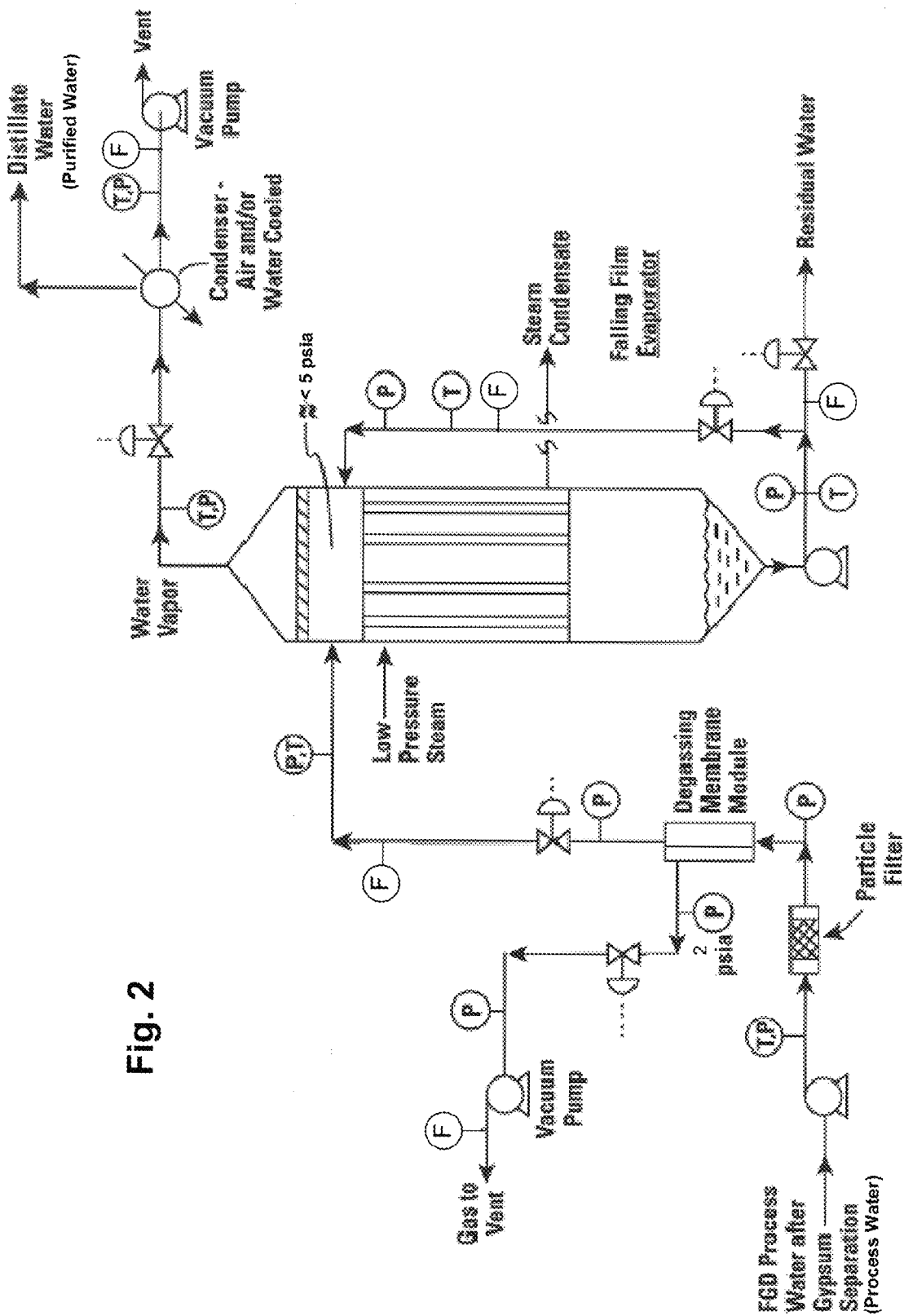
FIG. 2 provides a diagram of a system for purifying water, in accordance with an exemplary embodiment of the present invention.

In addition to methods of purifying process water, embodiments of the present invention also provide systems for purifying process water. As shown in FIG. 2, an exemplary embodiment of the present invention provides a system for purifying a process water comprising a degasifying membrane module and an evaporator. The degasifying membrane module can be configured to receive a process water comprising one or more dissolved gases and one or more dissolved ions. In an exemplary embodiment of the present invention, the degasifying membrane module can be configured to receive a process water comprising a first concentration of a first dissolved ion and a first concentration of a first dissolved gas. The membrane module can be configured to filter the process water to remove at least a portion of the dissolved gas(es) in the in the process water. For example, the membrane module can be configured to create a filtered process water comprising a second concentration of the first dissolved gas that is less than the first concentration of the first dissolved gas.

The evaporator can be configured to receive the filtered process water and evaporate the filtered process water to produce water vapor. The water vapor can have a concentration of the dissolved ion less than that of the process water. In an exemplary embodiment of the present invention, the water vapor can comprise a second concentration of the first dissolved ion that is less than the first concentration of the first dissolved ion.

In some embodiments, the system can further comprise a condenser configured to condense the water vapor to liquid water. The liquid water can have a concentration of the dissolved ion less than that of the process water. Thus, the liquid water can be purified.

In various embodiments of the present invention, the amount of dissolved gas removal can affect the composition of the distillate water, i.e., purified water, produced by methods of the present invention. For example, FGD water derived from a power plant burning bituminous coal may require a high degree of dissolved gas removal to produce distillate water that meets both the EPA's proposed composition limits for FGD water treatment processes and the needs for high-purity water uses in a power plant. For another type of FGD water derived from a power plant burning a different coal fuel, for example Powder River Basin coal, a lower level of dissolved gas removal can be used to satisfy the needs to meet both EPA's proposed composition limits for treated FGD water, and high-purity water needs of the power plant.

Various embodiments of the present invention provide significant advantages over conventional water treatment techniques. For example, some embodiments of the present invention allow approximately 90% of the whole FGD water to be converted to a distillate water stream that is suitable for a number of uses within the power plant. In some embodiments, minimal or no treatment of the distillate water would be needed for use in a power plant's steam loop, or other high-purity water uses. In some embodiments of the present invention, the distillate water produced by the process is of very high value, and can replace traditional water treatment used at power plants to satisfy the high-purity water needs of the steam cycle, and/or for NOx emission control/power augmentation in combustion turbines. In some embodiments of the present invention, the distillate water is of a composition that meets or exceeds strict limits for a number of constituents as set by EPA's proposed limits for FGD water treatment and for high-purity water uses, including selenium, arsenic, nitrate, mercury, chloride, sulfate. In some embodiments of the present invention, the process is resilient to FGD process upsets or wide variability of water conditions, including ORP swings, and changes in the concentration and form of constituents to be removed, including selenium and nitrate. In some embodiments of the present invention, by keeping the water volume in the falling film evaporators as small as possible, the time for process startup and shutdown can be reduced. In some embodiments of the present invention, a separate solids stream other than filter solids is not produced by the process, reducing materials handling. In some embodiments of the present invention, the amount of heat supplied to the evaporator and the flow rate of the distillate water stream are not linked, allowing for easier process control, and faster treatment process starts and stops. In some embodiments of the present invention, no reagents are used for water pre-treatment during process operation. In some embodiments of the present invention, process maintenance is reduced by minimal usage of mechanical equipment. In some embodiments of the present invention, flue gas desulfurization process water can be purified to achieve a distillate water with a concentration of selenium in the collected water vapor of less than 10 parts per billion.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A method for purifying a process water, comprising:
providing a process water comprising a first concentration of a first dissolved gas and a first concentration of a first dissolved ion;
filtering the process water with a degasifying membrane module to create a filtered process water comprising a second concentration of the first dissolved gas that is less than the first concentration of the first dissolved gas; and
evaporating the filtered process water to create a water vapor comprising a second concentration of the first dissolved ion that is less than the first concentration of the first dissolved ion.

2. The method of claim 1, wherein filtering the process water comprises passing the process water through the degasifying membrane module, the module comprising:
a water chamber at a first pressure, the water chamber comprising an inlet and outlet;
a vacuum chamber at a second pressure less than the first pressure; and
a membrane separating the water chamber from the vacuum chamber.

3. The method of claim 2, further comprising:
injecting the process water into the degasifying membrane module at the inlet of the water chamber;
diffusing at least a portion of the dissolved gas in the process water across the membrane and into the vacuum chamber to remove at least a portion of the first dissolved gas from the process water; and
ejecting the filtered process water out of the degasifying membrane module at the outlet of the water chamber.

4. The method of claim 3, wherein the first pressure minus the second pressure is no greater than about 40 PSI.

5. The method of claim 1, wherein the process water is evaporated at a pressure of less than 5 PSIA.

6. The method of claim 1, wherein the process water is evaporated at a temperature between about 40 degrees Celsius and about 65 degrees Celsius.

7. The method of claim 1, further comprising condensing the water vapor.

8. The method of claim 1, wherein the process water is a flue gas desulfurization process water, and wherein the plurality of dissolved ions comprises selenium, and wherein a concentration of selenium in the collected water vapor is less than 10 parts per billion.

9. The method of claim 1, wherein the process water further comprises a first concentration of a second dissolved ion, and wherein the water vapor further comprises a second concentration of the second dissolved ion that is less than the first concentration of the second dissolved ion.

10. The method of claim 1, wherein the process water further comprises a first concentration of a second dissolved gas, and wherein the filtered process water comprises a second concentration of the second dissolved gas that is less than the first concentration of the second dissolved gas.

11. A system for purifying a process water, comprising:
a degasifying membrane module configured to receive a process water comprising a first concentration of a first dissolved ion and a first concentration of a first dissolved gas and filter the process water to create a filtered process water comprising a second concentration of the first dissolved gas that is less than the first concentration of the first dissolved gas; and
an evaporator configured to receive the filtered process water and evaporate the filtered process water to produce water vapor, the water vapor comprising a second concentration of the first dissolved ion that is less than the first concentration of the first dissolved ion.

12. The system of claim 9, further comprising a condenser configured to condense the water vapor to liquid water.

13. The system of claim 11, wherein the degasifying membrane module comprises:
a water chamber at a first pressure, the water chamber comprising an inlet configured to receive the process water and an outlet configured to eject the filtered process water;
a vacuum chamber at a second pressure less than the first pressure; and
a membrane separating the water chamber and the vacuum chamber,
wherein the degasifying membrane module is configured to diffuse at least a portion of the dissolved gas in the process water across the membrane and into the vacuum chamber.

14. The system of claim 13, wherein the first pressure minus the second pressure is no greater than 40 PSI.

15. The system of claim 11, wherein a pressure within the evaporator is less than 5 PSIA.

16. The system of claim 11, wherein a temperature within the evaporator is between about 40 degrees Celsius and about 65 degrees Celsius.

17. The system of claim 11, wherein the process water is a flue gas desulfurization process water, and wherein the first dissolved ion is selenium, and wherein the second concentration of the first dissolved ion is less than 10 parts per billion.

18. The system of claim 11, wherein the process water further comprises a first concentration of a second dissolved ion, and wherein the water vapor comprises a second concentration of the second dissolved ion that is less than the first concentration of the second dissolved ion.

19. The system of claim 11, wherein the process water further comprises a first concentration of a second dissolved gas, and wherein the filtered process water comprises a second concentration of the second dissolved gas that his less than the first concentration of the second dissolved gas.

20. A method of purifying a process water, comprising:
injecting a process water into a water chamber of a degasifying membrane module, the process water comprising a first concentration of a first dissolved gas and a first concentration of a first dissolved ion, the degasifying membrane module comprising the water chamber at a first pressure, a vacuum chamber at a second pressure that is less than the first pressure, and a membrane separating the water chamber from the vacuum chamber;
diffusing a portion of the first dissolved gas across the membrane and into the vacuum chamber to create a filtered process water comprising a second concentration of the first dissolved gas that is less than the first concentration of the first dissolved gas;
ejecting the filtered process water from the water chamber;
receiving the filtered process water at an evaporator;
evaporating the filtered process water in the evaporator at a temperature between about 40 degrees Celsius and about 65 degrees Celsius and at a pressure less than about 5 PSIA to create a water vapor comprising a second concentration of the first dissolved ion that is less than the first concentration of the first dissolved ion.

* * * * *